(12) United States Patent
Yang et al.

(10) Patent No.: US 8,378,622 B2
(45) Date of Patent: Feb. 19, 2013

(54) ENERGY AND POWER MANAGEMENT INTEGRATED CIRCUIT DEVICE

(75) Inventors: Yil Suk Yang, Daejeon (KR); Jong Dae Kim, Daejeon (KR); Jae Woo Lee, Daejeon (KR); Se Wan Heo, Daejeon (KR); Moon Gyu Jang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 240 days.

(21) Appl. No.: 12/708,852

(22) Filed: Feb. 19, 2010

(65) Prior Publication Data

US 2011/0062912 A1 Mar. 17, 2011

(30) Foreign Application Priority Data

Sep. 14, 2009 (KR) .................. 10-2009-0086271

(51) Int. Cl.
*H01M 10/44* (2006.01)
*H02J 1/00* (2006.01)
(52) U.S. Cl. ........ 320/101; 320/132; 320/134; 320/136; 307/11; 307/18; 307/29; 307/32
(58) Field of Classification Search .................. 320/101
See application file for complete search history.

(56) References Cited

U.S. PATENT DOCUMENTS

| | | | |
|---|---|---|---|
| 6,433,522 B1 * | 8/2002 | Siri | 323/272 |
| 7,138,911 B2 | 11/2006 | Tyndall | |
| 7,365,455 B2 | 4/2008 | Hamel et al. | |
| 2001/0043050 A1 * | 11/2001 | Fisher, Jr. | 320/101 |
| 2008/0052544 A1 * | 2/2008 | Hsieh et al. | 713/300 |
| 2008/0079396 A1 | 4/2008 | Yamazaki et al. | |
| 2009/0079266 A1 * | 3/2009 | McNamara et al. | 307/64 |
| 2009/0127976 A1 | 5/2009 | Ward et al. | |
| 2009/0152947 A1 * | 6/2009 | Wang | 307/24 |
| 2010/0090656 A1 | 4/2010 | Shearer et al. | |

FOREIGN PATENT DOCUMENTS

| | | |
|---|---|---|
| JP | 10-248180 A | 9/1998 |
| JP | 2008-047666 A | 2/2008 |
| JP | 2008-109646 A | 5/2008 |
| KR | 1020080017460 A | 2/2008 |

OTHER PUBLICATIONS

I. Doms et al., "Integrated Capacitive Power-Management Circuit for Thermal Harvesters with Output Power 10 to 1000 µW," 2009 IEEE International Solid-State Circuits Conference, pp. 300-302, IEEE.

* cited by examiner

*Primary Examiner* — Edward Tso
*Assistant Examiner* — Johali Torres Ruiz

(57) ABSTRACT

Provided is an energy and power management integrated circuit (IC) device. The energy and power management IC device includes a plurality of energy conversion devices for harvesting energy from respective energy conversion sources and converting the energy into electric energy, an energy management IC (EMIC) for converting the electric energy converted by the energy conversion devices into stable energy, a storage device for storing the energy or power converted by the EMIC, a power management IC (PMIC) for receiving and distributing the power stored in the storage device, and a plurality of output load devices for consuming the power distributed by the PMIC. Accordingly, it is possible to harvest energy in an environmentally friendly way and semi-permanently use the energy without changing a battery.

16 Claims, 3 Drawing Sheets

ENERGY AND POWER MANAGEMENT INTEGRATED CIRCUIT DEVICE

CROSS-REFERENCE TO RELATED APPLICATION

This application claims priority to and the benefit of Korean Patent Application No. 10-2009-0086271, filed Sep. 14, 2009, the disclosure of which is incorporated herein by reference in its entirety.

BACKGROUND

1. Field of the Invention

The present invention relates to a power management integrated circuit (IC), and more particularly to an energy and power management IC device having a built-in processor for multiple self-charging power modules.

2. Discussion of Related Art

On the basis of power management IC technology, the power of a power source such as a battery is controlled and managed to be appropriately distributed according to the states of output loads including a radio frequency (RF) module, a processor, a peripheral device, a sensor, etc., thereby extending the life of the battery. As systems become complicated and provide various high-performance services, the power management IC technology is gradually getting important for mobile devices that use a power source of limited capacity such as a battery.

In general, a power management IC consists of a switching device and a power conversion and control circuit, and may be implemented as one chip or two chips according to application field. With the development of a power management IC process, power management ICs are gradually being implemented as one chip.

The power conversion and control circuit may be implemented in several methods, typically as a boost power conversion and control circuit, a buck power conversion and control circuit, and so on. Battery power management IC technology is being developed into high-function and high-performance power management IC technology obtained by combining battery management IC technology with existing power management IC technology.

FIG. 1 is a block diagram of a conventional battery power management IC device.

Referring to FIG. 1, a general battery power management IC device 100 includes a battery 110, a power management IC (PMIC) 120, a storage device 130, and an output load device 140.

The battery 110 transfers power to the PMIC 120.

The PMIC 120 controls and manages the power received from the battery 110. To be specific, the PMIC 120 stores the power received from the battery 110 in the storage device 130, and when necessary, receives and transfers the power stored in the storage device 130 to the output load device 140. Also, the PMIC 120 may transfer the power received from the battery 110 to the output load device 140 without storing it in the storage device 130.

The output load device 140 consumes the power received from the PMIC 120 by itself.

FIG. 2 is a detailed block diagram of the battery power management IC device of FIG. 1.

Referring to FIG. 2, the battery power management IC device 200 includes a battery 210, a battery protection circuit 220, a battery fuel gauge 230, a charge/discharge control and power control logic 240, a plurality of switch mode power supply (SMPS) converters 251 to 253, and a plurality of loads 261 to 263.

The PMIC includes the battery protection circuit 220, the battery fuel gauge 230, the charge/discharge control and power control logic 240, and the SMPS converters 251 to 253, and controls and manages the power of the power source to be appropriately distributed according to the states of the output loads 261 to 263, thereby extending the life of the battery 210.

The battery protection circuit 220 protects the internal circuit, and the battery fuel gauge 230 measures the remaining life of the battery 210 and transfers a control signal regarding the remaining life to the charge/discharge control and power control logic 240. The charge/discharge control and power control logic 240 receives power from an external direct current (DC) power supply, and generates and manages all the control signals of the circuit. The SMPS converters 251 to 253 convert DC voltage according to a control signal of the charge/discharge control and power control logic 240 depending on the states of the output loads 261 to 263 and transfer the converted DC voltage to the output loads 261 to 263.

However, when the above-described battery power management IC technology is applied to a wireless sensor node (WSN) system, it is very difficult to charge and change a battery.

In a conventional battery power system, the power management IC technology extends the life of a battery. However, because of the limited capacity and life of the battery, the power of the system is consumed, and application service fields are limited. Also, the battery needs to be changed because of its lifespan.

SUMMARY OF THE INVENTION

The present invention is directed to an energy and power management integrated circuit (IC) device that stores energy harvested from multiple energy harvesting devices in a storage device with high efficiency and high speed, distributes and manages the stored energy or power with high efficiency, and thus can be semi-permanently used without changing a battery.

One aspect of the present invention provides an energy and power management IC device including: a plurality of energy conversion devices for harvesting energy from respective energy conversion sources and converting the energy into electric energy; an energy management IC (EMIC) for converting the electric energy converted by the energy conversion devices into stable energy; a storage device for storing the energy or power converted by the EMIC; a power management IC (PMIC) for receiving and distributing the power stored in the storage device; and a plurality of output load devices for consuming the power distributed by the PMIC.

The PMIC may receive the electric energy directly from the energy conversion devices and distribute the electric energy.

The PMIC may distribute the power stored in the storage device or the electric energy directly received from the energy conversion devices to the EMIC.

The EMIC may include: an energy conversion source selector for selecting one of the energy conversion devices; an energy conversion source monitor unit for monitoring the energy conversion sources and controlling the energy conversion source selector to select an energy conversion source; and an energy converter for converting electric energy converted by the selected energy conversion device into energy to be stored in the storage device.

The energy converter may include an energy conversion circuit for performing direct current (DC)-DC conversion to increase or reduce an input voltage according to an input voltage level of the storage device and alternating current (AC)-DC conversion to convert generated AC energy into DC energy.

The PMIC may include: a processor and control circuit for generating and managing a control signal of the EMIC and the PMIC; a plurality of power converters for distributing and controlling the power stored in the storage device according to states of the output load devices; and a storage device state-of-charge (SOC) monitoring and protection circuit for monitoring a SOC of the storage device, and protecting the storage device not to be overcharged or overloaded.

The processor and control circuit may generate and manages a control signal for the PMIC to control the EMIC.

The EMIC may further include a processor and control circuit for generating and managing a control signal for the EMIC and the PMIC.

The processor and control circuit may generate and manage a control signal for the EMIC to control the PMIC.

The power converters may include a power conversion circuit having a DC-DC conversion function for driving an output load and a DC-DC conversion function for driving the EMIC.

The power converters may be implemented as buck converters, boost converters, buck-boost converters, or charge pumps.

The energy conversion sources may include sunlight, thermoelectricity, piezoelectricity, motion, or vibration.

The storage device may be a primary battery, a secondary battery, a supercapacitor, or a fuel cell.

The output load devices may be implemented as a radio frequency (RF) module, a processor, a peripheral device, or a sensor.

Powers of the EMIC and the PMIC may be provided by the storage device, or the power of PMIC may be provided by the storage device and the power of the EMIC may be provided by the PMIC.

BRIEF DESCRIPTION OF THE DRAWINGS

The above and other objects, features and advantages of the present invention will become more apparent to those of ordinary skill in the art by describing in detail exemplary embodiments thereof with reference to the attached drawings, in which.

DETAILED DESCRIPTION OF EXEMPLARY EMBODIMENTS

Hereinafter, exemplary embodiments of the present invention will be described in detail. However, the present invention is not limited to the embodiments disclosed below but can be implemented in various forms. The following embodiments are described in order to enable those of ordinary skill in the art to embody and practice the present invention. To clearly describe the present invention, parts not relating to the description are omitted from the drawings. Like numerals refer to like elements throughout the description of the drawings.

Throughout this specification, when an element is referred to as being "connected" or "coupled" to another element, it can be directly connected or coupled to the other element or electrically connected or coupled to the other element with yet another element interposed between them.

Throughout this specification, when an element is referred to as "comprises," "includes," or "has" a component, it does not preclude another component but may further include the other component unless the context clearly indicates otherwise. Also, as used herein, the terms " . . . unit," " . . . device," " . . . module," etc., denote a unit of processing at least one function or operation, and may be implemented as hardware, software, or combination of hardware and software.

Energy management integrated circuit (IC) technology converts and controls energy using multiple energy conversion devices based on sunlight, heat, piezoelectricity (vibration), and so on. An energy management IC serves to efficiently store power that is much less stable than stable battery power in a storage device and control it.

Figure 1:
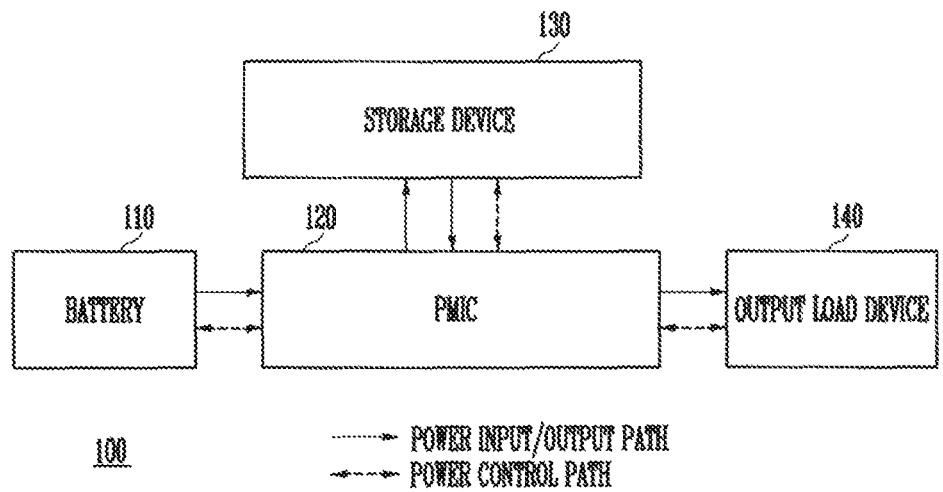
FIG. 1 is a block diagram of a conventional battery power management integrated circuit (IC) device.
Figure 2:
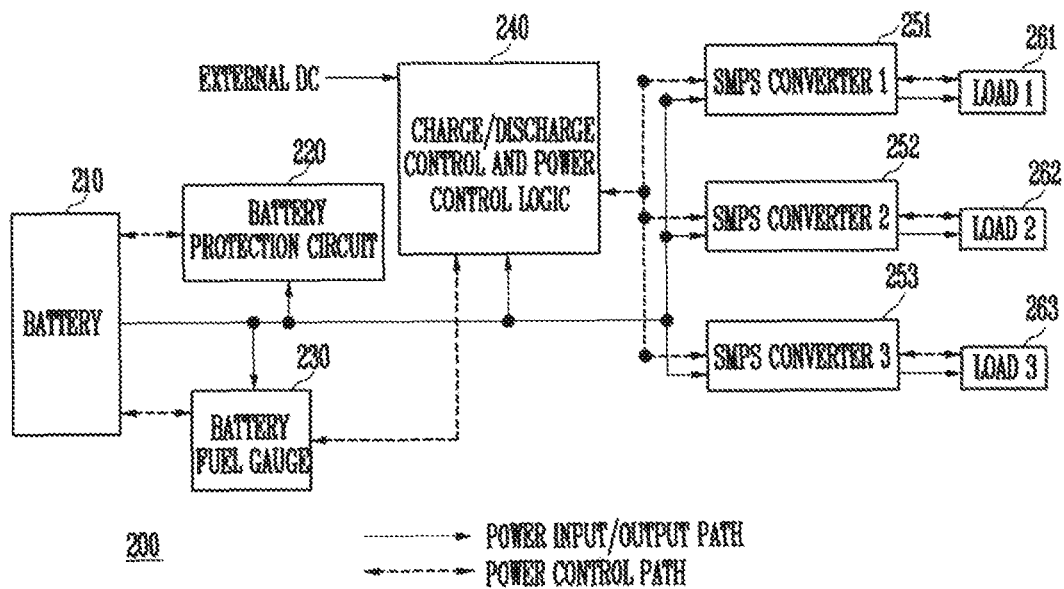
FIG. 2 is a detailed block diagram of the battery power management IC device of FIG. 1.
Figure 3:
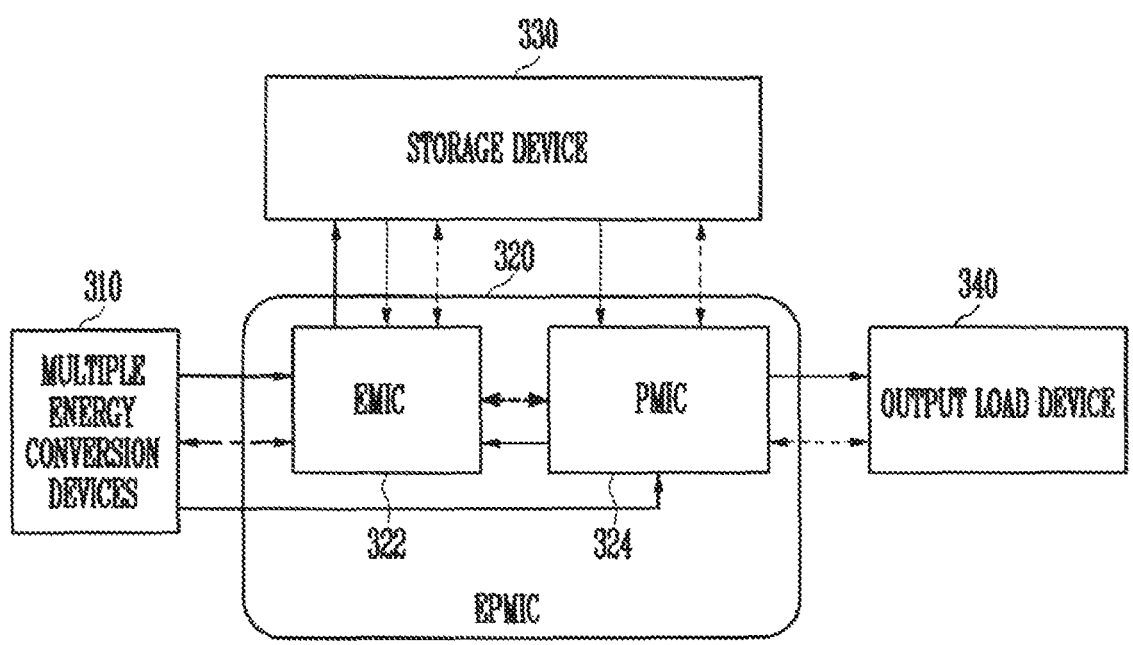
FIG. 3 is a block diagram of an energy and power management IC device according to an exemplary embodiment of the present invention.

FIG. 3 is a block diagram of an energy and power management IC device according to an exemplary embodiment of the present invention.

Referring to FIG. 3, an energy and power management IC device 300 according to an exemplary embodiment of the present invention includes multiple energy conversion devices 310, an energy and power management IC (EPMIC) 320, a storage device 330, and output load devices 340.

The energy and power management IC device 300 is divided into two modules. The first module is a self-charging power module including the multiple energy conversion devices 310 and the storage device 330, and the second module is a processor-embedded EPMIC module including an energy management IC (EMIC) 322 and a power management IC (PMIC) 324 that manage, distribute and control input/output energy and power.

The multiple energy conversion devices 310 harvest energy from energy conversion sources and convert the energy into electric energy. The multiple energy conversion devices 310 are energy conversion devices that use sunlight, thermoelectricity, piezoelectricity, motion, vibration, etc., of surroundings.

The EPMIC 320 includes the EMIC 322 and the PMIC 324.

The EMIC 322 stably stores unstable input energy converted by the multiple energy conversion devices 310 in the storage device 330 with high efficiency and high speed, and controls the stored energy.

The energy converted by the multiple energy conversion devices 310 has severe ripples and is unstable. The EMIC 322 may convert such unstable energy into stable energy using a voltage regulator or current regulator included therein.

The EMIC 322 may include various types of energy conversion circuits and control circuits, and a battery management circuit.

The PMIC 324 distributes and manages power stored in the storage device 330 according to the states of the output load devices 340 with high efficiency. Also, the PMIC 324 efficiently manages and distributes the stored power to the EMIC 322, and directly controls electric energy converted by the multiple energy conversion devices 310 without storing it in the storage device 330.

In other words, there is a path through which electric energy converted by the multiple energy conversion devices 310 is stored in the storage device 330 by a control signal of the EMIC 322 and the stored power is distributed to the output load devices 340 by a control signal of the PMIC 324, and there is another path through which electric energy converted by the multiple energy conversion devices 310 is directly distributed to the output load devices 340 by a control signal of the PMIC 324 without being stored in the storage device 330. The two types of different paths can be appropriately used according to application field.

The PMIC 324 may include various types of power conversion circuits, control circuits and protection circuits, and a built-in processor.

The storage device 330 stores electric energy converted by the energy conversion devices 310. To be specific, the storage device 330 stores energy or power converted by the EMIC 322. In general, power is stored in the storage device 330. However, since power becomes energy on the basis of time, it is to be understood that energy is stored in the storage device 330 in consideration of the charging or discharging time of a battery. Descriptions below will be made based on energy.

The powers of the EMIC 322 and the PMIC 324 may be provided by the storage device 330. To be specific, the power of the PMIC 324 may be provided by the storage device 330, and the power of the EMIC 322 may be provided by the PMIC 324.

The storage device 330 may be implemented as a primary battery, a secondary battery, a supercapacitor, and so on.

The output load devices 340 consume stored power or electric energy obtained through harvesting and conversion by themselves. To be specific, when power stored in the storage device 330 or electric energy directly transferred from the energy conversion devices 310 without being stored in the storage device 330 is distributed by the PMIC 324, the output load devices 340 consume the energy or power.

The output load devices 340 may be a radio frequency (RF) module, a processor, a peripheral device, a sensor, and so on.

Figure 4:
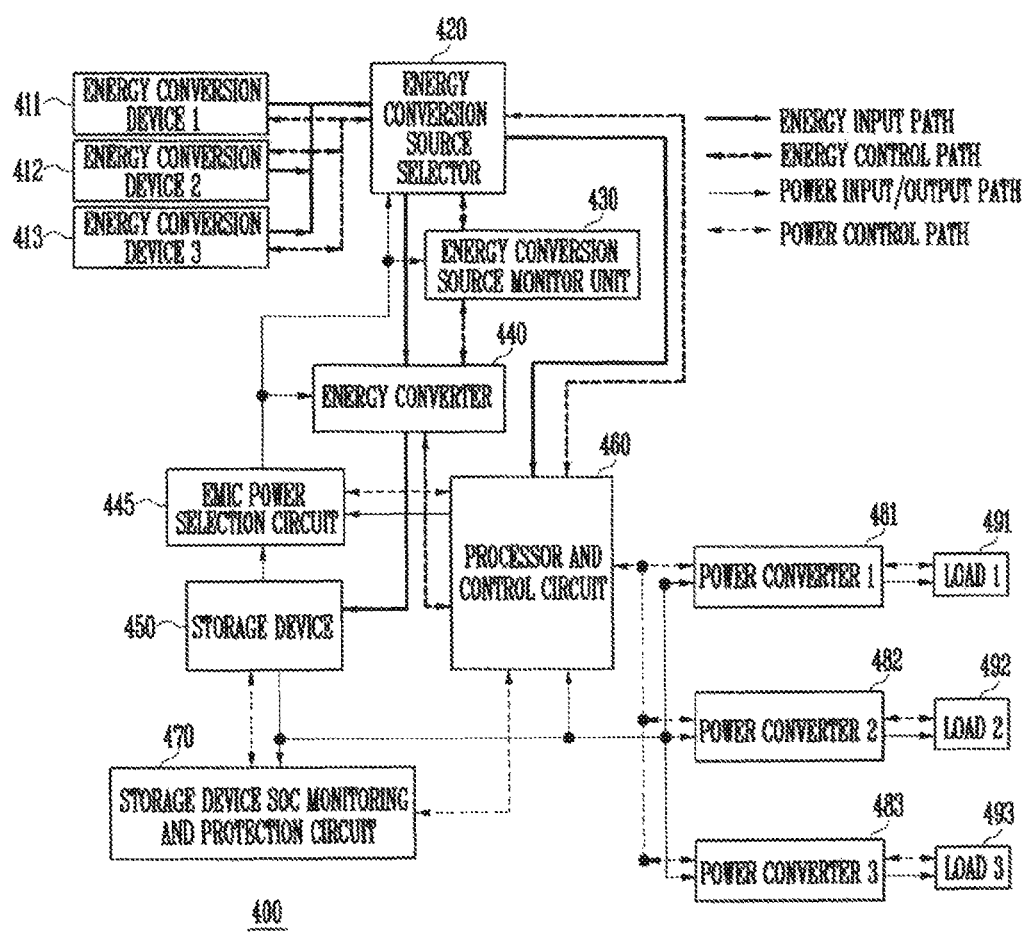
FIG. 4 is a detailed block diagram of the energy and power management IC device of FIG. 3.

FIG. 4 is a detailed block diagram of the energy and power management IC device of FIG. 3.

Referring to FIG. 4, an energy and power management IC device 400 has a built-in processor for multiple self-charging power modules, and includes a plurality of energy conversion devices 411 to 413, an energy conversion source selector 420, an energy conversion source monitor unit 430, an energy converter 440, an EMIC power selection circuit 445, a storage device 450, a processor and control circuit 460, a storage device state-of-charge (SOC) monitoring and protection circuit 470, a plurality of power converters 481 to 483, and a plurality of loads 491 to 493.

In FIG. 4, three each of energy conversion devices, power converters and loads are shown as an example, but the number of the components may vary.

The EMIC includes the energy conversion source selector 420, the energy conversion source monitor unit 430, and the energy converter 440, and efficiently and rapidly charges the storage device 450 with electric energy converted by the energy conversion devices 411 to 413 in response to an energy control signal of the processor and control circuit 460.

The energy conversion source selector 420 selects one of the energy conversion devices 411 to 413. To select an energy conversion source, the energy conversion source monitor unit 430 monitors energy conversion sources and controls the energy conversion source selector 420.

In other words, electric energy of one energy conversion device selected by the energy conversion source selector 420 among input electric energies harvested and converted by the energy conversion devices 411 to 413 is passed through the energy converter 440 and stored in the storage device 450. At this time, the energy conversion source selector 420 selects an energy conversion source according to the monitoring result of the energy conversion sources.

The energy converter 440 converts irregular and fluctuating electric energy converted by the selected energy conversion device into stable energy to rapidly and efficiently store it in the storage device 450.

To this end, the energy converter 440 controls and monitors the energy conversion devices 411 to 413, controls storage of harvested and converted energy, and prevents overcharge of the storage device 450. Also, the energy converter 440 functions as an interface connecting the energy conversion devices 411 to 413 with the PMIC, and controls constant voltage or constant current.

Furthermore, the energy converter 440 performs direct current (DC)-DC conversion to increase or reduce an input voltage according to an input voltage level of the storage device 450 and alternating current (AC)-DC conversion to convert generated AC energy into DC energy. To rapidly charge the storage device 450, the energy converter 440 controls the magnitude of input current and matches the output resistances of the energy conversion devices 411 to 413.

The EMIC power selection circuit 445 enables selection of whether the EMIC will be supplied with power from the storage device 450 or the processor and control circuit 460.

The PMIC includes the processor and control circuit 460, the storage device SOC monitoring and protection circuit 470, and the power converters 481 to 483, and distributes stored power according to variation of the output loads 491 to 493 or directly distributes electric energy harvested from the energy conversion devices 411 to 413 and converted to the output loads 491 to 493 without storing it in the storage device 450.

The processor and control circuit 460 generates and manages all control signals of the EPMIC. For example, a control signal for controlling the input energy management IC, a control signal for controlling the output load power management IC, and a control signal for the PMIC to control the EMIC are generated and managed.

In this example embodiment, the processor and control circuit 460 is included in the PMIC and controls the EMIC, but may be included in the EMIC and controls the PMIC.

The processor may be implemented as various types of microcontroller units (MCUs), digital signal processors (DSPs), microprocessing units (MPUs), etc., having a built-in memory and peripheral devices capable of implementing an EPMIC control algorithm and an external interface.

The storage device SOC monitoring and protection circuit 470 conducts a storage device SOC monitoring function and a protection circuit function. The storage device SOC monitoring circuit monitors a SOC of the storage device 450 to distribute power stored in the storage device 450 to the power converters 481 to 483, and the protection circuit protects the storage device 450 not to be overcharged or overloaded.

The power converters 481 to 483 distribute and control power stably stored in the storage device 450 according to the states of the output loads 491 to 493. To this end, the power converters 481 to 483 prevent overload, and have an interface function between the storage device 450 and the EMIC.

Also, the power converters 481 to 483 monitor the storage device 450, have a low drop out (LDO) function for output load power (used when an input voltage is slightly higher than a desired output voltage) and a LDO function for EMIC power, and perform DC-DC conversion for driving an output load and the EMIC.

The power converters 481 to 483 may be implemented as various types of conversion circuits, for example, buck converters, boost converters, buck-boost switch mode power supplies (SMPSs), or charge pumps.

An energy and power management IC device according to an exemplary embodiment of the present invention can harvest and convert energy in an environmentally friendly way, and thus it is possible to semi-permanently use the energy without changing a battery. Thus, the energy and power management IC device can be used as the power supply of a low-power radio frequency identification/ubiquitous sensor network (RFID/USN) system or a wireless sensor node system.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. An energy and power management integrated circuit (IC) device, comprising:
    a plurality of energy conversion devices configured to acquire energy from a plurality of energy conversion sources and convert the acquired energy into electric energy;
    an energy management IC (EMIC) configured to convert the electric energy converted by the energy conversion devices into stable energy;
    a storage device configured to store the stable energy as power; and
    a power management IC (PMIC) configured to receive the power stored in the storage device and distribute the power to a plurality of output load devices according to states of the output load devices,
    wherein the output load devices are configured to consume the power distributed by the PMIC.

2. The energy and power management IC device of claim 1, wherein the PMIC is configured to selectively receive the electric energy directly from the energy conversion devices and distribute the electric energy to the plurality of output load devices, without storing the electric energy in the storage device, according to the states of the output load devices.

3. The energy and power management IC device of claim 2, wherein the PMIC is further configured to distribute the power stored in the storage device or the electric energy directly received from the energy conversion devices to the EMIC.

4. The energy and power management IC device of claim 1, wherein the EMIC includes:
    an energy conversion source selector configured to select one of the energy conversion devices;
    an energy conversion source monitor unit configured to monitor the energy conversion sources and control the energy conversion source selector; and
    an energy converter configured to convert electric energy converted by the selected energy conversion device into the stable energy to be stored in the storage device.

5. The energy and power management IC device of claim 4, wherein the energy converter includes an energy conversion circuit configured to perform direct current (DC)-DC conversion to increase or reduce an input voltage according to an input voltage level of the storage device and perform alternating current (AC)-DC conversion to convert AC energy into DC energy.

6. The energy and power management IC device of claim 4, wherein the EMIC further includes a processor and control circuit configured to generate and manage control signals to control the EMIC and the PMIC.

7. The energy and power management IC device of claim 6, wherein the processor and control circuit is configured to generate and manage a control signal for allowing the EMIC to control the PMIC.

8. The energy and power management IC device of claim 1, wherein the PMIC includes:
    a processor and control circuit configured to generate and manage control signals to control the EMIC and the PMIC;
    a plurality of power converters configured to distribute the power stored in the storage device to the plurality of output load devices according to the states of the output load devices; and
    a storage device state-of-charge (SOC) monitoring and protection circuit configured to monitor a SOC of the storage device and protect the storage device from being overcharged or overloaded.

9. The energy and power management IC device of claim 8, wherein the processor and control circuit is configured to generate and manage a control signal for allowing the PMIC to control the EMIC.

10. The energy and power management IC device of claim 8, wherein each of the power converters includes a power conversion circuit configured to perform a direct current (DC)-DC conversion function to drive a corresponding output load and the EMIC.

11. The energy and power management IC device of claim 8, wherein the power converters include any of buck converters, boost converters, buck-boost converters, and charge pumps.

12. The energy and power management IC device of claim 1, wherein each of the energy conversion sources includes any of sunlight, thermoelectricity, piezoelectricity, motion, and vibration.

13. The energy and power management IC device of claim 1, wherein the storage device includes any of a primary battery, a secondary battery, a supercapacitor, and a fuel cell.

14. The energy and power management IC device of claim 1, wherein each of the output load devices includes any of a radio frequency (RF) module, a processor, a peripheral device, and a sensor.

15. The energy and power management IC device of claim 1, wherein the EMIC and the PMIC receive power from the storage device.

16. The energy and power management IC device of claim 1, wherein the PMIC the EMIC receive power from the storage device and the PMIC, respectively.

* * * * *